United States Patent [19]

Krentel

[11] Patent Number: 4,903,923
[45] Date of Patent: Feb. 27, 1990

[54] COMPONENT KNOCK DOWN DISPLAY RACK

[76] Inventor: Kenneth A. Krentel, 716 N. Broad St., Philadelphia, Pa. 19130

[21] Appl. No.: 238,303

[22] Filed: Aug. 30, 1988

[51] Int. Cl.$^4$ .............................................. A47G 23/02
[52] U.S. Cl. ..................................... 248/153; 248/151
[58] Field of Search ............... 248/153, 151, 152, 146, 248/127, 165, 188.1, DIG. 7; 220/1 T, 401, 402, 403, 408, 85 H

[56] References Cited

U.S. PATENT DOCUMENTS

| | | | |
|---|---|---|---|
| 967,368 | 8/1910 | Grigsby | 248/153 X |
| 1,001,416 | 8/1911 | Lloyd | 248/153 X |
| 2,673,053 | 3/1954 | Kilian | 248/153 |
| 2,719,689 | 10/1955 | Umstead | 248/153 |
| 4,694,972 | 9/1987 | Bimonte et al. | 220/401 |

FOREIGN PATENT DOCUMENTS

| | | | |
|---|---|---|---|
| 0690886 | 7/1964 | Canada | 248/153 |
| 1213835 | 4/1960 | France | 248/153 |

OTHER PUBLICATIONS

10/30/77 Rowe Manse Product Literature.
Product Literature for SDI 001, WWB 001 and VBM 800.
Bradbury Barrel Company. Models 1614-98DU, 1414B, 1814B, 2014B.
Bradbury Barrel Company, C.S. 1984-85.
Bradbury Barrel Company Models 1618 H-4, 1824 H-4, 2030 H-3.

Primary Examiner—Ramon O. Ramirez
Attorney, Agent, or Firm—Benasutti and Murray

[57] ABSTRACT

A knock down display rack for retail sales operations in which the display rack is easily disassembled into component pieces which nest into a relatively easily shippable arrangement. The display rack includes a top container support, a container and a base. When assembled, the top container support contacts the base member at a number of contact points distinct from the points of interconnection between the base and top members.

6 Claims, 2 Drawing Sheets

COMPONENT KNOCK DOWN DISPLAY RACK

FIELD OF THE INVENTION

The present invention relates to display racks for retail sales operations and more particularly to a knock down display rack adapted to support a container for retail sales operations.

BACKGROUND OF THE INVENTION

In retail sales, the display of items is of extreme importance. Many purchases are so-called impulse purchases where attractive packaging and placement of the item in a position where potential purchasers will see the item will result in a sale. Convenient, attractive display racks play an important role in such impulse purchases as well as for conventional purchases. In displaying items, row after row of display shelves, as in a typical grocery store is effective for certain types of sales. Such displays, however are inefficient and expensive for impulse purchase items. Displays for impulse items are preferably individual or small displays of a group of related items which can be easily placed in a conspicuous location. The displays preferably expose the item in order to attract attention. Examples of display for impulse items are the magazine and candy displays employed at a typical food store adjacent the cashiers. As the sales methods for impulse items have developed, display racks have evolved to include adjustable as well as customized display racks for a wide variety of individual items. Certain impulse sales items while adaptable to packaging for hanging displays are more readily displayed in bulk in open containers such as baskets. Such baskets can be placed at aisle ends, near islands and other open areas to increase the effective display area of a store. The design of display racks for impulse sales items such as carded or individual goods typically comprises a metal wire frame. Such display racks while relatively light in weight are difficult to transport and store due to their bulky nature. Shipping of such display racks is also hindered by their size.

SUMMARY OF THE INVENTION

The present invention provides a display rack adapted for use with a basket or other container to accept loose items which is easily disassembled into component pieces which nest into a relatively small easily shippable arrangement. The display rack of the present invention includes a base, a top basket support and a backet The top basket support is releaseably mounted to the base to support the basket. The top contacts the base an a number of contact points distinct from the connection points. When the top is separated from the base, the top and the basket can "nest" with the base to provide a relatively compact, easily shippable unit.

DETAILED DESCRIPTION OF THE PREFERRED EMBODIMENT

Figure 1:
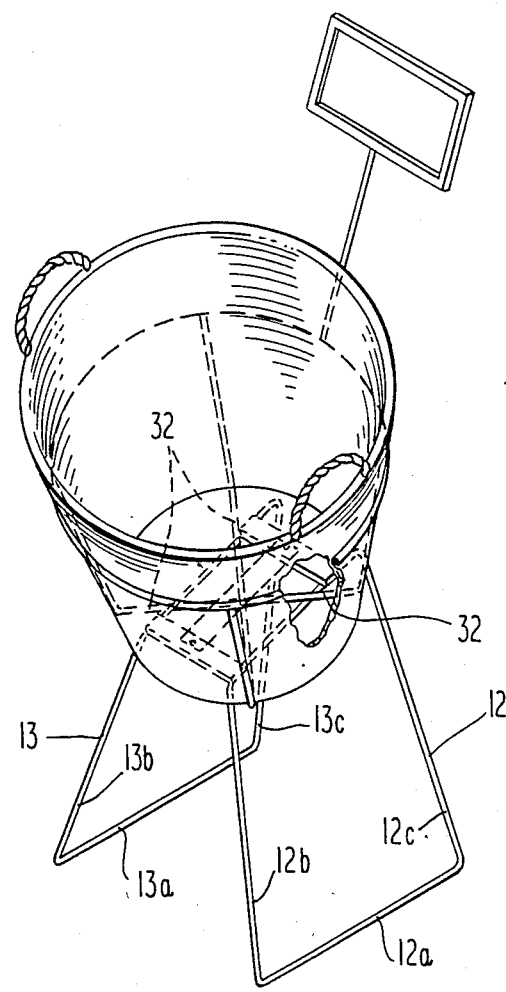
FIG. 1 is a perspective view of a display rack of the present invention assembled for use.
Figure 2:
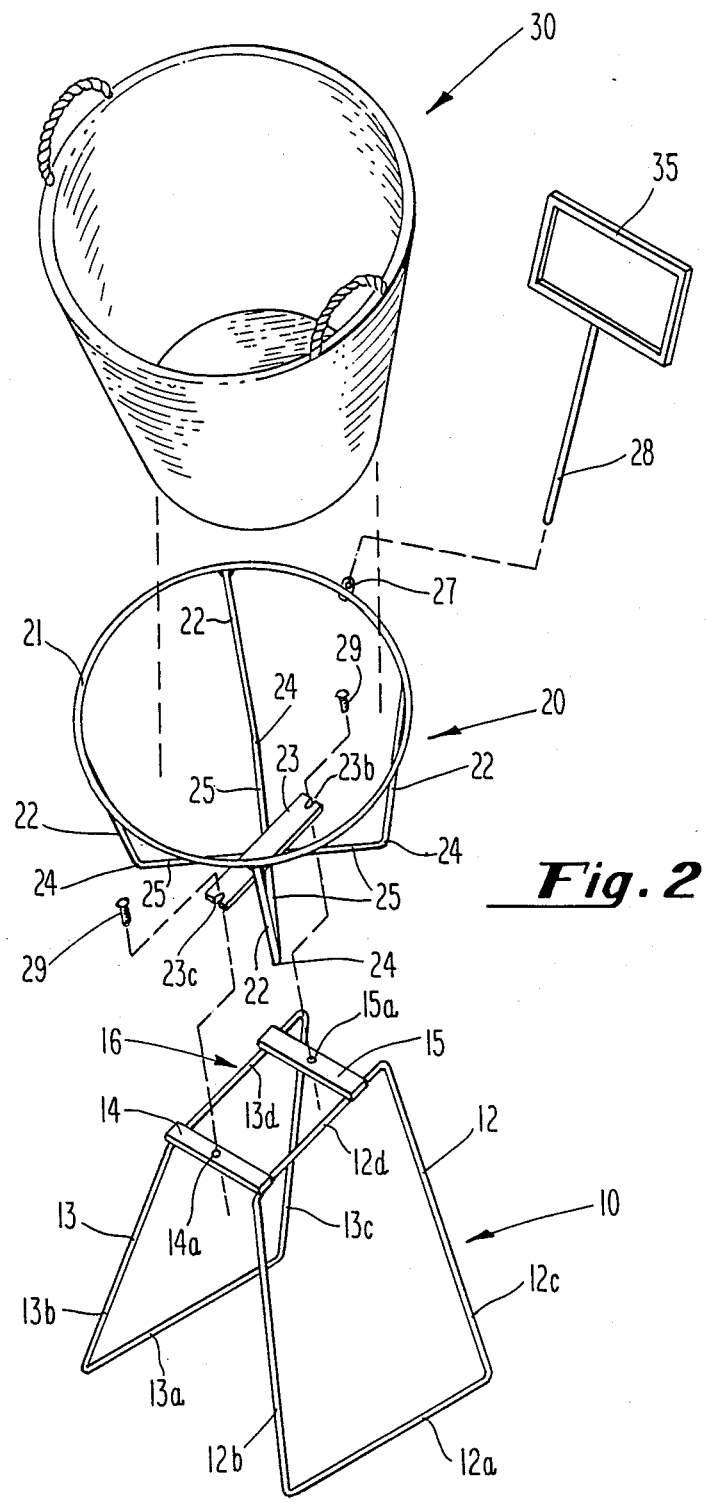
FIG. 2 is a perspective view, partially cut away, of a display rack ofthe present invention disassembled.

With reference to FIGS. 1 and 2 the display rack of the present invention includes a support base 10, a top support 20 an a container 30. The support base 10 comprises a pair of substantially trapezoidally shaped legs 12 and 13. The legs 12 and 13 include a bottom section 12a and 13a adapted to rest on the floor. Extending upwardly from bottom sections 12a and 13a are front uprights, 12b and 13b and rear uprights, 12c and 13c respectively. The uprights of legs 12 and 13 are connected by tops 12d and 13d respectively. The legs 12 and 13 are interconnected at the tops 12d and 13d by cross members 14 and 15. Cross member 14 extends between top 12d and top 13d adjacent front uprights 12b and 13b. Cross member 15 extends between top 12d and 13d adjacent rear upright 12c and 13c. Front cross member 14 is preferably oriented lower than the rear cross member 15 so that the support surface 16 of support base 10 is angled with respect to the horizontal at approximately 10° to 20°. Retaining holes 14a and 15a are oriented at the midpoint of cross members 14 and 15 respectively.

Top support 20 includes a circular ring 21 and a number of support arms 22 extending from ring 21 to base 23. Top support 20 is preferably the shape of a truncated cone with ring 21 forming the base of the cone. Supports 22 extend from ring 21 forming the general shape of the cone. The supports 22 each have a substantially right angle bend 24 and a segment 25 extending toward the longitudinal axis of the cone. The segments 25 are fixed to base 23 by welding or other suitable means.

Segments 25 are fixed to base 23 on the lower surface 23a of base 23. Base 23 includes openings 23b and 23c adapted to align with holes 14a and 15a of cross member 14 and 15. When base 23 is align with cross members 14 and 15, holes 29 are inserted to releasably fixed top support 20 to support base 10. When base 23 is fixed to cross members 14 and 15, segments 25 contact tops 12d and 13d of legs 12 and 13 as indicated at 32. The tops of support base 10 thus contact the bottom of top support 20 at a number of spaced apart, distinct points in order to provide a stable display rack.

Fixed to ring 21 is a bracket support 27. Bracket support 27 is internally threaded to receive an end of threaded rod 28. When fixed to support 27, threaded rod 28 extends upward substantially vertically as a support for a sign holder 35.

A basket 30 or other container fits within top support 20, resting on segments 25. The basket 30 holds the items to be displayed.

Figure 3:
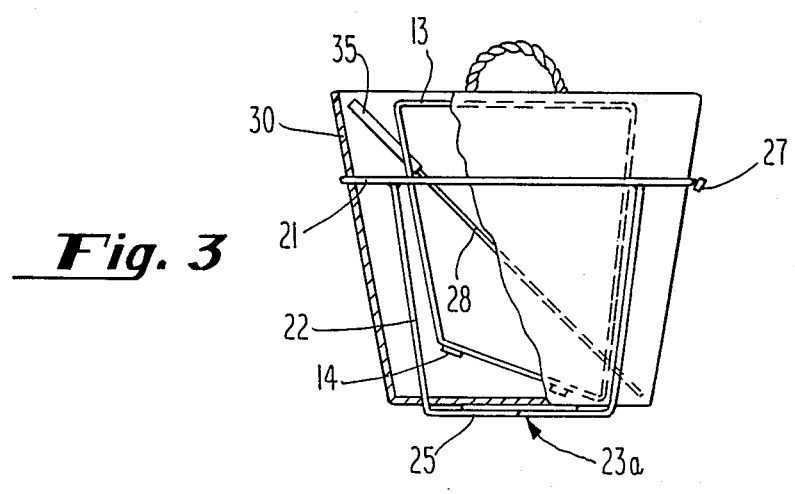
FIG. 3 is a side view, partially cut away, of a display rack of the present invention nested for shipping.

The support base 10 is adapted to fit within the basket 30 and top support 20 when bolts 29 are removed and support base 10 is inverted. Rod 28 can be removed from bracket 27 and also stored in basket 30. FIG. 3. This knocked down arrangement provides a relatively compact unit for shipping which is quickly and easily assembled for use.

The display rack of the present invention provides a stable, easily shipped display rack for use in merchandising impulse or other items. The display may be formed from metal rod as shown or any other suitable material.

It should be understood that the foregoing description and drawings of the invention are not intended to be limiting but are only exemplary of the inventive features which are defined in the claims.

What is claimed is:

1. A display rack to provide a container support for merchanise which comprises:
   (a) a container;
   (b) a top section adapted to receive said container;
   (c) a bottom section adapted to support said top section including first means to releaseably interconnect with said top section at a plurality of connection points and to contact said top section at a plurality of distinct contact points and further adapted to fit within said top section in a nested manner for shipment; and,
   (d) said top section having a bottom portion with second means to interconnect with and contact said bottom section and adapted to receive said container.

2. The display rack of claim 1, wherein said top section is substantially in the shape of an inverted truncated cone.

3. The display rack of claim 1, wherein said bottom section comprises two substantially trapezoidally shaped legs joined by a planar support adapted to receive said top section.

4. The display rack of claim 3, wherein said first means to releaseably interconnect comprises of two substantially horizontal connecting members extending between said legs.

5. The display rack of claim 4, wherein said means to contact comprises a plurality of elements forming the bottom portion of said top section adapted to contact said legs adjacent said connencting members.

6. The display rack of claim , wherein said top section further includes means to receive an upwardly extending sign support.

* * * * *

UNITED STATES PATENT AND TRADEMARK OFFICE
CERTIFICATE OF CORRECTION

PATENT NO. : 4,903,923

DATED : February 27, 1990

INVENTOR(S) : Kenneth A. Krentel

It is certified that error appears in the above-identified patent and that said Letters Patent is hereby corrected as shown below:

In Column 1, line 21, after the word "However", insert --,--.

In Column 1, line 53, after the word "a", delete the word [backet].

In Column 1, line 53, after the word "a", insert the word --basket.--.

In the Claims:

Column 3, line 4, before the word "which", delete the word [merchanise].

Column 3, line 4, before the word "which", insert the word --merchandise--.

Column 4, line 16, after the word "claim" insert --1--.

Signed and Sealed this

Twenty-third Day of April, 1991

*Attest:*

HARRY F. MANBECK, JR.

*Attesting Officer*            *Commissioner of Patents and Trademarks*